Nov. 13, 1934.  J. RABATÉ ET AL  1,980,696
ELECTRICALLY HEATED MELTING POT, PARTICULARLY FOR LINOTYPES
Filed Dec. 1, 1932  4 Sheets-Sheet 1

Inventors:
Jean Rabaté
Wytze Beije Smits
By Williams, Bradbury, McCabe & Hinkle
Attys.

Nov. 13, 1934.  J. RABATÉ ET AL  1,980,696
ELECTRICALLY HEATED MELTING POT, PARTICULARLY FOR LINOTYPES
Filed Dec. 1, 1932  4 Sheets-Sheet 2

Inventors:
Jean Rabaté
Wytze Beije Smits
By Williams, Bradbury, McCaleb & Hinkle
Attys.

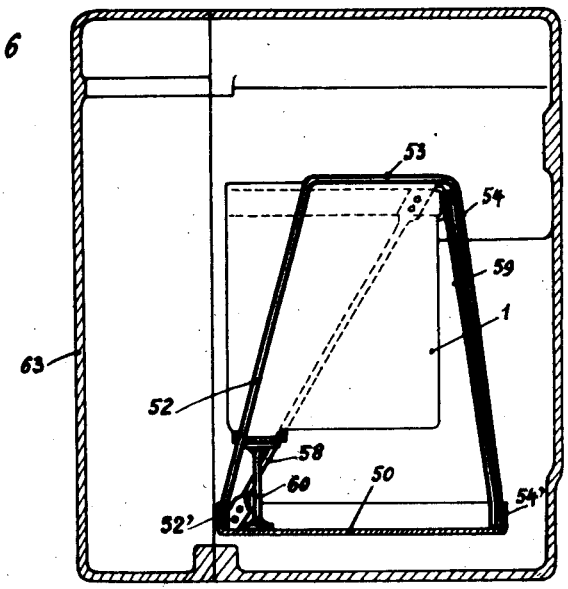
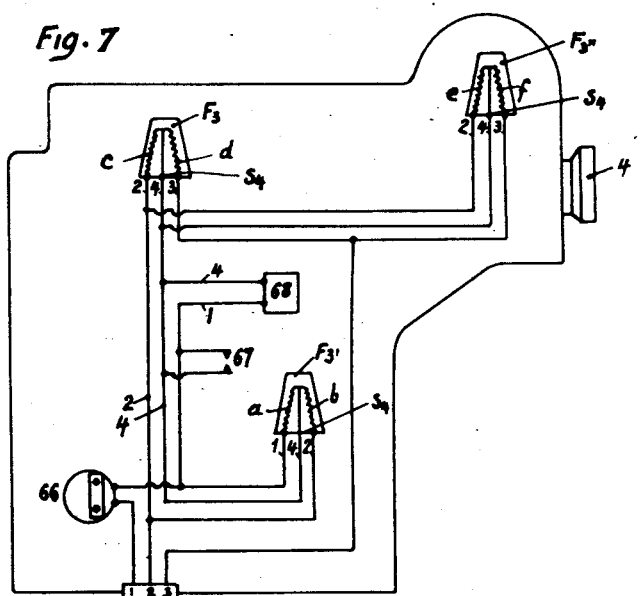

Nov. 13, 1934.    J. RABATÉ ET AL    1,980,696
ELECTRICALLY HEATED MELTING POT, PARTICULARLY FOR LINOTYPES
Filed Dec. 1, 1932    4 Sheets-Sheet 4
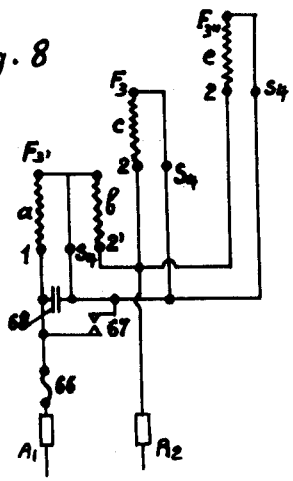
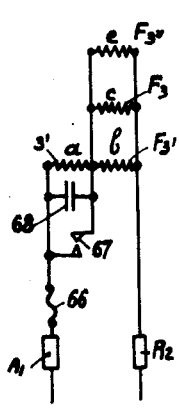
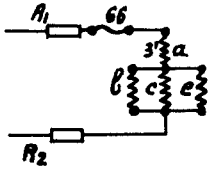
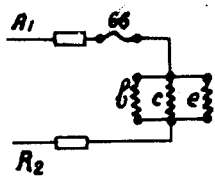
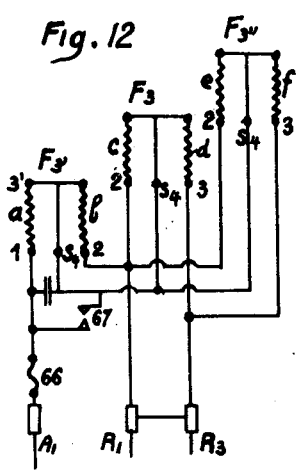
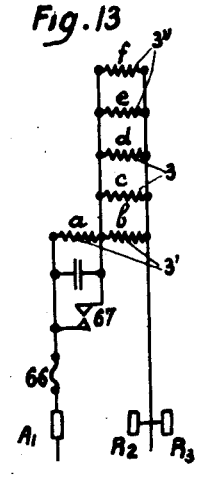
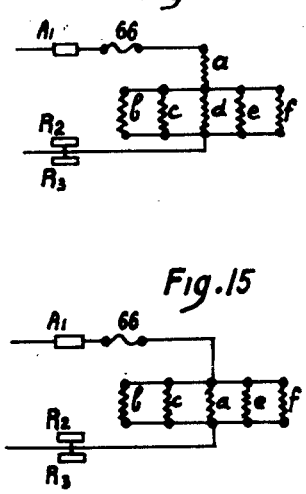
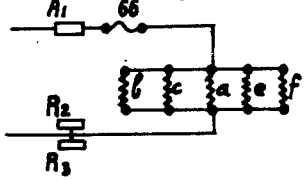
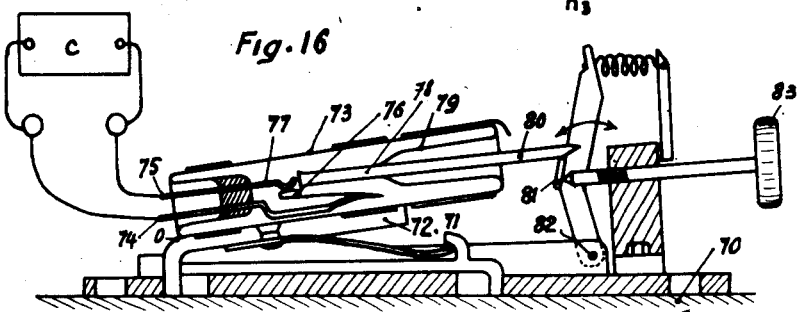
Inventors:
Jean Rabate
Wytze Beije Smits.
By Williams, Bradbury, McCaleb & Hinkle
Attys.

Patented Nov. 13, 1934

1,980,696

UNITED STATES PATENT OFFICE 1,980,696

ELECTRICALLY HEATED MELTING POT, PARTICULARLY FOR LINOTYPES

Jean Rabaté, Paris, France, and Wytze Beije Smits, Cassel-Wilh, Germany

Application December 1, 1932, Serial No. 645,156
In France November 30, 1931

10 Claims. (Cl. 219—44)

The present invention relates to electrically heated melting pots, especially those used for melting the "type metal" employed in linotypes.

The melting pots of this kind at present known are of relatively large dimensions and capacity. The electric heating resistances are either immersed in the pot or applied to the outside of same. They exhibit certain inconveniences.

Insulating them against heat losses is difficult on account of their large size and the restricted environment so that heat is wasted, and in consequence, the consumption of electrical energy is high. The efficiency of the electrical resistances is low and an excess of power is necessary which has an adverse effect on the uniformity of temperature of the bath of molten metal so that the automatic thermo-regulator with which the pots are equipped comes into action very often and wears out quickly.

When the pot is fed by a chain conveyor which drops small masses or pigs of metal into the bath, the feed device causes the molten metal to spurt in a highly inconvenient manner. When the feed device consists of a pig, the lower end of which dips into the molten bath, a loss of heat occurs over the entire hot surface of the pig.

Other inconveniences that may be mentioned are: Excessive temperature of the shell of the melting pot. Difficult replacement of the heating members and of the sensitive portion of the automatic thermo-regulator. Cumbering the outside of the melting pot with accessories, such as thermo-regulators for the metal in the pot and the mouth of the pot and a large number of electric wire connections.

Deterioration of the heating members in the event of any notable fall in the level of the metal in the pot and unduly slow rate of heating up the pot.

The object of the invention hereinafter described is an electric melting pot which obviates these inconveniences and provides certain advantages which will be set forth later. In accordance with one feature of the invention, the electrical heating resistances are accommodated in the mass of the shell of the pot in the form of tapered members and the shell and said members are both made of materials with the same coefficient of expansion and are good conductors of heat, or consist preferably of one and the same metal, such as aluminium, possessing said quality.

This system of heating, which takes up a minimum amount of room, enables the dimensions of the pot to be very considerably reduced, for example, to a capacity of 7 kgs. of type metal, and consequently enables the pot to be surrounded with an efficient heat insulator. It also gives a very high uniformity of temperature, owing to the intimate contact which always exists between the shell of the pot and the heating members.

For the pot to function properly, it is essential that the spout through which the molten metal is discharged, and also the lip, should be well heated. Moreover, in order to prevent fracture of the pot when reheated after a prolonged stoppage, it is essential that the type metal which has solidified in the pot should begin to melt at the surface. These results are obtained by a judicious selection—an example of which will be given later—of the position of the projecting portions of the pot in which the members of the heating resistances are housed.

When said pot is fed automatically by means of a chain conveyor the spurting of molten metal when the small pigs of metal drop into the bath is prevented by a special device for catching the pigs consisting of a float disposed in a well of the pot.

The preferred embodiment comprises the following devices:

a. The melting pot which is made of externally polished aluminium and is of small capacity, such as about 7 kgs. of type metal, is enclosed in a casing which is as large as the available space of the machine permits, and also houses the devices that usually cumber the exterior of the pot. Said casing is of aluminium polished inside and out and the pot is supported in its interior in such a way as to be insulated from its walls, for example, by means of braced tubes. The free space is filled with the best heat insulating material. The upper part of the casing is provided with an opening just large enough for the introduction of the metal for charging the bath, and for the passage of the piston rod, and the casing is also provided, on the side affording access to the heating members (described above) with a detachable heat insulated door.

By thus enclosing the melting pot proper in an aluminium casing, polished inside and out, and with which it is in contact only by means of the ends of a small number of tubular supports and is also separated from the casing by an excellent heat insulator, the losses of heat towards the outside are reduced to a minimum, and the consumption of electric current is lessened accordingly.

The arrangement on one and the same face of the melting pot of all its accessories, viz: the openings for inserting the heating members, the thermo-regulator, the electrical leads, etc., and the corresponding arrangement on the casing of a detachable heat-insulated door affording access to the said face of the pot, provide considerable facilities for the inspection and replacement of all these accessory devices.

b. The thermo-regulator of the heating resistance circuit is arranged in such a manner that, when the temperature is below the normal working level, a group of resistances, connected in parallel, is alone in operation, and when the temperature is above said level, an auxiliary resistance is connected up in series with the aforesaid parallel resistances.

Owing to the possibility of these two groupings of the heat members controlled by the thermo-regulator, a high uniformity of control is obtained. Practical experience has shown that the maximum divergence in temperature does not exceed 1° C. when the pot, full of molten metal, is not in use. When in use, the variation does not exceed a few degrees.

c. The automatic regulator is mounted on an outside face of the melting pot and consists of a couple, the contacts being enclosed in a bulb under a fairly high vacuum.

With the substitution of a regulator of this kind for those at present employed, the apparatus functions in a far more satisfactory manner. Moreover, since the melting pot, according to the invention, constitutes a fairly considerable mass of aluminium, it is always at the same temperature as the bath by reason of the aforesaid devices for the construction of the pot and for housing the resistances, so that with a regulator constituted in the aforesaid manner, it has been found possible to dispense with the thermo-regulator, for the lip of the crucible that is provided in all the existing apparatus. In said apparatus, the thin section of metal connecting the body of the pot with the lip, the distance between the two and, finally, the low conductive coefficient of the metal forming the pot (usually cast iron or steel) resulted in preventing the lip of the pot from having the same temperature as the bath, and that, moreover, this difference in temperature varied with each type of melting pot, so that since the temperature of the lip ought to be controllable to within a few degrees it was absolutely necessary to provide a special thermo-regulator near the lip.

d. The circuit of the heating resistances is provided with a commutator and the heating resistances are grouped in such a manner that, as may be desired, for example, for establishing or restoring the working temperature, a larger number can be connected in parallel than for normal running in order to reduce by about one-half the time required for establishing said temperature.

With the existing melting pots, the delay in the work of composition, caused more particularly by electrical failures, is prolonged by the time required for heating up the bath again after the current has been restored, and this reheating of the melting pots is relatively protracted by reason of their large capacity and poor heat insulation.

In the heating pot according to the invention, the establishment or restoration of the working temperature after an electrical breakdown, is greatly accelerated owing to the small capacity (about 7 kgs.) of the bath, the careful heat insulation and, moreover, by the fact that the aforesaid arrangement for connecting up the resistances enables the heating devices to be operated under special conditions of acceleration.

The resistances are arranged, as regards both position and heating power, in such a way that the solidified bath is heated at first from above in order to prevent the fracture to which the pots would be liable if, before melting the surface of the bath, the lower portion of the same were melted and, in expanding, would burst the walls of the pot.

An embodiment of an electric melting pot according to the invention is hereinafter described and illustrated in the accompanying drawings by way of example:

Figures 4–6 represent, respectively, in side elevation, plan and end elevation of the side containing the lip, of a melting pot having a system of tubular supports inside the casing.

Figures 7–15 relate to the heating circuit arrangements. Figure 7 represents the whole and approximately as arranged on the apparatus, the other figures being diagrams relating to the several functional stages.

Figures 8–11 relate to the circuit arrangement for normal working. Figure 8 shows this arrangement disposed in approximately the same manner as in Figure 7.

Figure 9 is a simplified representation showing more clearly the relative positions of the resistances with regard to their connection in parallel or in series.

Figures 10 and 11 show the resistances in circuit when the circuit breaker is open and when it is closed.

Figures 13–15 relate to the arrangement for speeding up, employed for quickly establishing or restoring the working temperature, and represent for that contingency the same indications as given in Figures 8–11 for ordinary running.

Figure 16 is a diagrammatic representation of an embodiment of the circuit breaker actuated by a couple.

Figure 1:
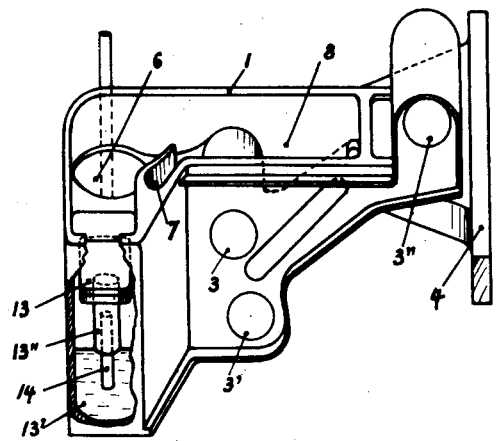
Figure 1 is a perspective view as seen from a slightly elevated position, in which the front wall of the pot is partly removed to reveal the float that catches the pigs of type metal.

The melting pot is composed of an aluminium block 1, the upper part of which is hollowed to form a shallow trough 1" (Figure 2) containing the bath—with the level 1'—of molten type metal. At one end (the left) the trough deepens to form a cylindrical well 6 containing the piston 6' which periodically discharges a certain quantity of molten metal through the spout passage 5 to the lip 4. Near the same end of the trough another well 13' (Figure 1) contains a float 13 which is extended downwards by a tube guided with a considerable free play on a rod 14. This float serves to catch the pigs of metal to be melted which are tipped into the bath at intervals by an automatic feed device of known type.

Figure 2:
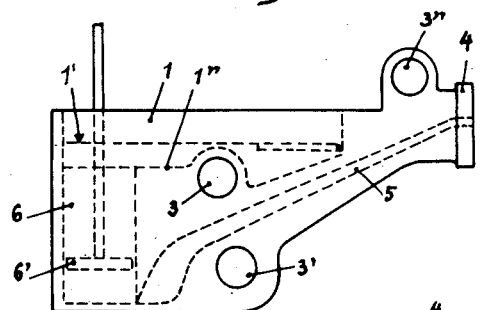
Figure 2 is an exact elevation.

As can be seen chiefly in Figure 2, the trough 1" and its wells 6 and 13, together with the spout passage 5, take up only a comparatively small amount of room in the metallic mass of the melting pot 1, so that considerable portions of said mass are solid, and it is in these that the members 3, 3' and 3" of the electric heating resistances are disposed. Each of said members is formed by a slightly tapered metal rod, in which is embedded an insulated resistance wire. Said member is housed in a recess of a precisely similar form, with the walls of which its taper shape assures intimate contact, that is to say, a good transmission of heat. As already mentioned, the shell of the melting pot and the heating resistance members are composed of materials which may be identical or not, having the same coefficient of expansion so that the aforesaid intimacy of contact is maintained at all temperatures. Both of them are very good conductors of heat, being, for example, made of aluminium or one of its alloys.

One of said members 3 is located near the surface of the bath, and for that purpose the bottom of the trough 1" is provided with a nearly central ridge; another one 3' is located at the intake of the passage 5 and the third 3" in a boss near the lip 4. A multiple branch commutator (not shown) enables these resistances to be put into or out of circuit, or connected in series or in parallel. This combination of several conditions of heating is arranged so that when the metal that has solidified in the trough as the result of a long stoppage of the machine, is to be remelted, the melting is begun at the upper part of the metal and is then caused to extend quickly to the metal in the wells.

When the machine is working, this arrangement of the resistances ensures a uniform temperature in all parts of the bath so that the molten metal injected into the mould is thoroughly homogeneous and produces good "slugs" which ensure a good impression.

Figure 3:
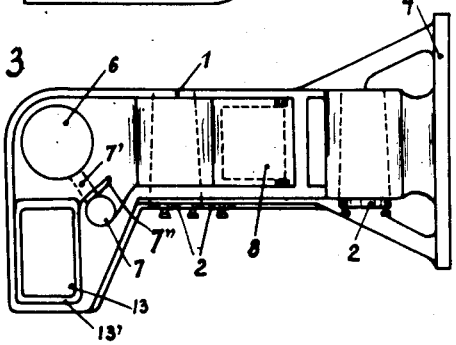
Figure 3 is a plan.

The supply of molten metal to the delivery cylinder 6 below the piston 6' is ensured by a small well 7 (Figure 3) the bottom of which communicates with that of the cylinder through a passage 7'. To enable this small well to be supplied at the upper end with well melted metal, a baffle wall 7" isolates it from the well 13' which receives the metal pigs to be melted and places the well 7 in communication with that portion of the upper trough 1" which is adjacent to the heating resistance 3.

The float 13 is so arranged that it projects slightly above the bath when not loaded, and, when it catches a metal pig that is to be melted it submerges with the pig into the bath. Its rising and falling movements are braked by the removal and replacement of the molten metal lodged between its cylinder 13" and guide tube 14.

Where the feeding device consists of a pig dipping into the bath of the melting pot, the said pig is adapted to dip into the portion 8 of the bath whilst the float controlling the descent of the pig will be housed in the well 13'.

The melting pot may therefore be equipped with any kind of automatic feeding device.

Figure 4:
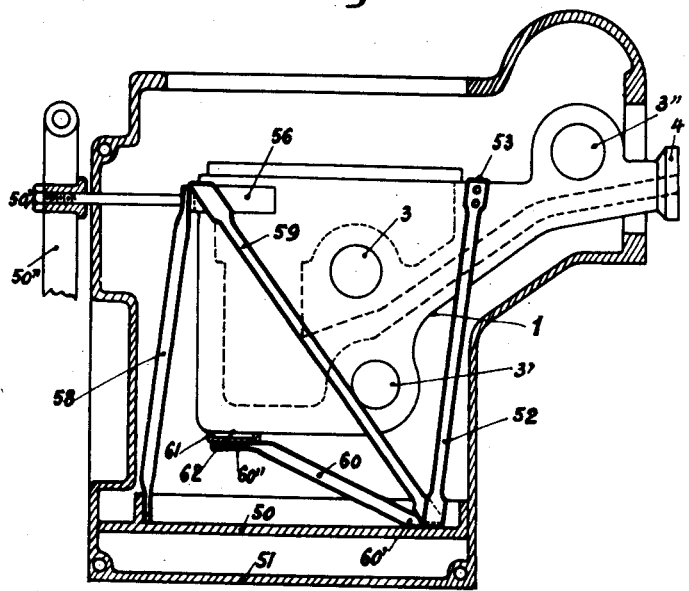
Figure 5:
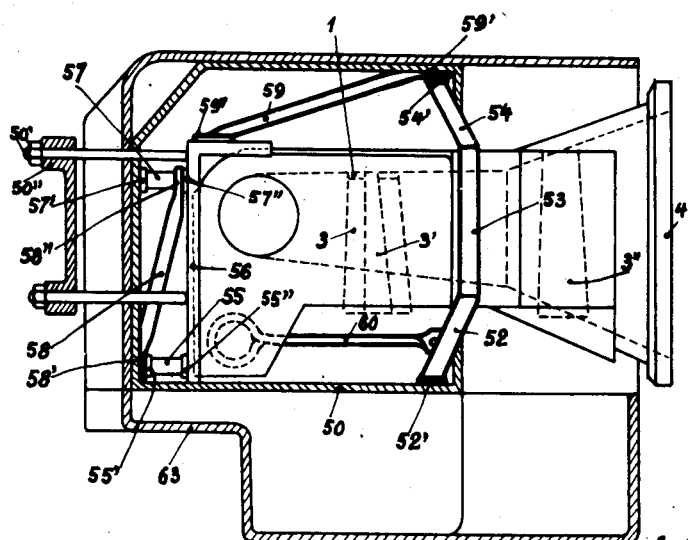

According to Figures 4–6, the electric melting pot 1 (the various parts of which are indicated by the same reference numerals as in the preceding figures) comprises the heating resistances 3, 3', 3", the last being located near the lip 4.

The pot 1 is supported by a certain number of tubes connecting it with a kind of tray 50 mounted in the casing 51, the latter surrounding the apparatus without touching the pot 1.

For example, there passes, over the front of the pot, a tube composed of three members; the member 52 (Figure 5) which is secured to the side of the tray 50 at 52'; the member 53 which passes over and is secured to the upper part of the pot, and the member 54 which is secured at 54' to the other side of the tray 50.

At the back the pot is supported on the one hand by a tube 55 attached at 55' to the tray 50, and at 55" to a U-shaped bracket 56 which embraces a projecting rim provided on the corresponding faces of the pot 1. On the other hand the pot 1 is supported by a tube 57 similarly attached at 57' and 57" whilst the suspension device at the rear is completed by a diagonal tube 58 secured, below at 58' and above at 58". On one side of the pot is a transverse tube 59 secured below at 59' and above at 59". The other side intended to form the face of the pot on which are situated all the accessories, particularly the mouths of the housings for the heating resistances 3, 3', 3" and the thermo-regulator, is left free. The supporting leg 60 (Figure 4) the lower end of which is attached at 60' to the tray 50, terminates at the upper end 60" in a cap 61 engaging on a boss 62 on the lower face of the pot. Two set screws 50' mounted in the rear lugs 50" of the support of the pot pass through the casing 51 and abut against the back of the pot 1.

The detachable door of the casing is situated in 63 on the same side of the pot as the accessories, electric connections and automatic thermo-regulator.

In the diagram, Figure 7, representing the electric connections approximately as arranged, shows the heating members $F_3$ located at the upper part of the bath $F_3'$ at the lower part and $F_3''$ near the lip 4. The resistance of each of these members is divided into two portions, c—d, a—b, and e—f respectively.

The supply circuit is represented by the two wires A and R, adapted by means of circuit breakers 65, to connect A with $A_1$ and R with $R_2$ alone or with both $R_2$ and $R_3$ together.

The terminal $A_1$ is connected with a fuse 66 protecting the melting pot against any dangerous rise in temperature and also with one of the extremities 1 of the resistance a of the heating member $F_3'$. The terminal $R_2$ is in connection with the other extremity 2 of the resistance b of the member $F_3'$, and also with the extremities 2 of the resistances c of the heating members $F_3$ and $F_3''$.

Moreover, the centre 4 of each of the double resistances of the heating members is connected to interconnected terminals $S_4$, the circuit of which can be placed in communication with the terminal $A_1$ by means of the circuit breaker of the automatic regulator 67 (which is shunted by a condenser 68, to absorb the sparking on the circuit being broken).

According to Figures 8–11 the circuit for normal running comprises the lead-in through the terminal $A_1$, the fuse 66, the half resistance a of the heating member $F_3$ and afterwards in shunt connection through the circuit of the terminals $S_4$ the resistances b of the member $F_3'$, c of the member $F_3$ and e of the member $F_3''$ and is completed through their extremities 2 by returning to the terminal $R_2$.

When closed the circuit breaker 67 of the automatic regulator shunted by its condenser 68, supplies this circuit between the resistances a and b directly through the terminals $S_4$, that is to say, cuts out the resistance a. The return is also made through the terminal $R_2$.

When the circuit breaker 67 (Figure 7) is closed (Figure 11) the intensity of the current flowing in parallel through a resistance b, c, e of each of the three heating members, is greater and the heating is increased. If, on the contrary, the circuit breaker be open (Figure 10) the resistance a is interposed in series with b, c, e in parallel, the total resistance is considerably increased and the output in the resistances $a, b, c, e$ considerably diminished, so that the heating of each resistance is sensibly lessened, and consequently that of the whole, although there is one more resistance, viz. $a$ in service. However, the two resistances $a, b$, of the heating member $F_3$ are jointly in operation and the heating of the lower part of the bath, that is to say, at the part where the greatest fluidity of the bath is necessary, is increased. The heating elements $a, b$ might also be situated in another of the housings for the heating members.

For intensified working (Figures 12-15) the current arriving by way of the terminal $A_1$ and fuse 66, and being adapted to leave through the terminals $R_2$, $R_3$ supplies, by way of the circuit of the terminals $S_4$, the half-resistance $b$ of the lower heating member $F_3'$, the resistances $c, d$ of the upper heating member $F_3$ and the resistances $e, f$ of the member $F_3''$ heating the lip, whilst the second resistance $a$ of the lower member $F_3'$ is placed in series with its five resistances $b, c, d, e, f$ in parallel when the regulator 67 is open. In this way, the circuit arrangement for the supply through the open regulator (Figure 14) is obtained, that is, for reduced heating, and that (Figure 15) through the closed regulator i. e. for increased heating.

At the same time it will be evident that in each of these last two cases the heating power will be notably greater than in normal running (Figures 8-11) because the number of parallel resistances being greater, the total resistance is diminished and consequently for a given voltage the intensity of the current traversing each resistance is increased.

According to Figure 16 the wall 70 of the melting pot 1 carries a regulator composed of a couple 71/72 in the shape of a U, and so arranged that the application of heat causes the U to open out. On the outer branch, is mounted a vacuum tube 73 into which the two conductors 74—75 of the electric circuit penetrate. The extremity of one of them, 74, carries a small flat spring 76, the end of which faces the extremity 77 of the other conductor 75. A rod 78 mounted in a slightly flexible glass stem 79, which is reentrant in the tube 73, prevents contact between 76 and 77 when the device is out of action, but enables such contact to occur when, as the result of the expansion of the U of the couple, its outer end 80 bears against a rod 81 which is carried by a member pivoted at 82 and can be adjusted by means of a screw 83. The gap 76—77 is shunted by a condenser C.

When the temperature of the melting pot rises, the couple expands, and the tube 78 ascends, oscillating about the point O. By means of the rod 80 bearing against 81 the contact 76 is kept stationary, whereas the contact 77 ascends, thus breaking the circuit and connecting a resistance in series, thereby reducing the rate of heating.

When the temperature of the melting pot sinks, the procedure is reversed, contact between 76 and 77 being restored and thereby short-circuiting the resistance previously inserted in series so that the rate of heating is accelerated.

It will be understood that the specified electric heating devices, though designed in particular for linotype melting pots, are applicable to all melting pots in apparatus in which a metal bath is required to be maintained at a very constant temperature and to be capable of being quickly restored to working condition, even after a stoppage or breakdown. This is the case, for example, with stereotype furnaces for supplying the stereo-casting machines with well melted type metal.

What we claim is:—

1. Electrically heated melting pot for linotypes and the like, comprising a pot proper made of aluminum and having a small capacity of about seven kilograms of metal, a casing for said melting pot being of the largest size permissible by the room available on the linotype and made of aluminum polished inside and out, braced tubes for supporting said melting pot in said casing, heat insulating material spacing said melting pot from said casing, apertures in the casing for charging the melting pot with the metal to be melted and for the passage of a piston rod for operating a piston in a well formed in the melting pot to discharge the melted metal therefrom, one side of the melting pot having removable heating elements, an automatic thermo-regulator, electrical leads and other accessories arranged thereon, and a heat insulated door in said casing in front of said side of the melting pot.

2. Electrically heated melting pot for linotypes and the like, comprising a pot for receiving the metal to be melted, a casing adapted to enclose the pot, means supporting the pot within the casing, heat insulating material between the pot and the casing, said melting pot having a plurality of tapered recesses therein, a heating element in the form of a tapered rod in each recess, the heating elements and the melting pot being made of metals with substantially the same coefficient of expansion and which are very good conductors of heat.

3. Electrically heated melting pot according to claim 1, in which said removable heating elements are made of aluminum.

4. Electrically heated melting pot for linotypes and the like, comprising a pot for receiving the metal to be melted, a casing adapted to entirely enclose the pot, means supporting the pot within the casing, heat insulating material spacing the pot from the casing, three horizontally arranged tapered recesses in the mass of the pot, the first being located underneath and near the surface of the melted metal, the second at an intake for a spout passage and the third at the mouth of said spout passage, tapered heating elements being arranged in said recesses.

5. Electrically heated melting pot for linotypes and the like, comprising a pot for receiving the metal to be melted, a casing adapted to entirely enclose the pot, means supporting the pot within the casing, heat insulating material spacing the pot from the casing, an aperture in the casing, a cavity in said pot for receiving metal pigs dropped individually through said aperture and means for catching the metal pigs to prevent splashing of the molten metal in the melting pot.

6. Electrically heated melting pot for linotypes and the like, comprising a pot for receiving the metal to be melted, a casing adapted to entirely enclose the pot, means supporting the pot within the casing, heat insulating material spacing the pot from the casing, an aperture in said casing, a cavity in the melting pot for catching metal pigs dropped through said aperture by an automatic feeding device, said cavity comprising a well provided at the falling place of the metal pigs, a tube axially disposed in said well and secured to the bottom of said well, and a float adapted to be loosely and slidably guided on said tube and control the movement of each metal pig as it dips into the melted metal.

7. Electrically heated melting pot for linotypes and the like, comprising a pot for receiving the metal to be melted, a casing adapted to entirely enclose the pot, means supporting the pot within the casing, heat insulating material spacing the pot from the casing, a cavity in said pot containing the molten metal, a well in said pot, a piston in said well for delivering molten metal from the pot, a feeding well connecting the bottom of the delivery well with the cavity, and a baffle arranged at the intake of said feeding well and opening towards the hottest part of the molten metal in said cavity.

8. Electrically heated melting pot for linotypes and the like, comprising a pot for receiving the metal to be melted, a casing adapted to entirely enclose the pot, means supporting the pot within the casing, heat insulating material spacing the pot from the casing, tapered recesses arranged horizontally in the mass of the melting pot, a tapered heating element in each recess, and a thermo-regulator for automatically connecting in parallel heating resistances in said heating elements and coupling in series therewith an auxiliary resistance when there is an abnormal rise of temperature.

9. Electrically heated melting pot for linotypes and the like, comprising a pot for receiving the metal to be melted, a casing adapted to entirely enclose the pot, means supporting the pot within the casing, heat insulating material spacing the pot from the casing, tapered recesses arranged in the mass of the melting pot, a tapered heating element in each recess, said heating elements comprising resistances having two parts connected in series, and a circuit breaker adapted for coupling in parallel a variable number of said parts of said resistances.

10. Electrically heated melting pot for linotypes and the like, comprising a pot for receiving the metal to be melted, a casing adapted to entirely enclose the pot, means supporting the pot within the casing, heat insulating material spacing the pot from the casing, heating elements in the mass of said pot all arranged to be removed from one side of said melting pot, and an automatic thermo-regulator arranged on said side of said pot, said thermo-regulator consisting of a couple.

JEAN RABATÉ.
WYTZE BEIJE SMITS.